United States Patent
Okada

[19]

[11] Patent Number: 6,112,028
[45] Date of Patent: Aug. 29, 2000

[54] IMAGE-SHAKE CORRECTING DEVICE

[75] Inventor: Tadanori Okada, Utsunomiya, Japan

[73] Assignee: Canon Kabushiki Kaisha, Tokyo, Japan

[21] Appl. No.: 09/288,898

[22] Filed: Apr. 9, 1999

[30] Foreign Application Priority Data

Apr. 20, 1998 [JP] Japan .................................. 10-109499

[51] Int. Cl.[7] .................................................. G03B 17/00
[52] U.S. Cl. ............................................. 396/55; 396/52
[58] Field of Search ....................................... 396/52, 55

[56] References Cited

U.S. PATENT DOCUMENTS

| | | | |
|---|---|---|---|
| 5,619,293 | 4/1997 | Usui | 396/55 |
| 5,671,448 | 9/1997 | Usui | 556/55 |
| 5,854,947 | 12/1998 | Imura | 396/55 |
| 5,883,742 | 3/1999 | Kamata | 396/55 |
| 5,926,656 | 7/1999 | Imura et al. | 396/55 |
| 5,930,531 | 7/1999 | Kitagawa et al. | 396/55 |
| 5,978,598 | 11/1999 | Ishikawa | 396/55 |
| 6,011,927 | 1/2000 | Kamata | 396/55 |

*Primary Examiner*—Russell Adams
*Attorney, Agent, or Firm*—Robin, Blecker & Daley

[57] ABSTRACT

An image-shake correcting device includes a fixed frame having a sliding surface, a correction lens unit arranged to correct an image shake, a holding member arranged to hold the correction lens unit, and a driving part for driving the correction lens unit in a direction perpendicular to an optical axis, wherein a magnet member is provided on one of the fixed frame and the holding member and a magnetic substance is provided on the other of the fixed frame and the holding member, the holding member is pressed into contact with the sliding surface of the fixed frame by a magnetic force produced by the magnet member and the magnetic substance, and the holding member is arranged to be slid on the sliding surface of the fixed frame by the driving part.

7 Claims, 6 Drawing Sheets

IMAGE-SHAKE CORRECTING DEVICE

BACKGROUND OF THE INVENTION

1. Field of the Invention

The present invention relates to an image-shake correcting device for optically correcting an image shake resulting from unexpected vibrations by driving a part of a phototaking optical system.

2. Description of Related Art

Image-shake correcting devices have heretofore been arranged for preventing an image shake resulting from the vibrations of hands holding a camera in taking pictures by detecting the vibrating state of the camera with vibration detecting means and shifting a correction lens in the direction perpendicular to an optical axis according to the result of vibration detection.

The camera having such an image-shake correcting device is arranged to movably hold the correction lens, which constitutes at least a part of a photo-taking lens system. Shaking of images is canceled by moving the correction lens within a plane perpendicular to the optical axis of a main optical system in such a direction as to absorb the image shake.

In the image-shake correcting device, a coil and a magnet are arranged to constitute an electromagnetic actuator with one of them mounted on a fixed part and the other on a lens holding frame which holds the correction lens. The image-shake correcting device is thus arranged to directly move the lens holding frame. It is advantageous, in respect of reduction in size and saving of electric energy, to mount the magnet, which is heavier in weight, on the fixed part and the coil, which is lighter in weight, on the lens holding frame. Accordingly, the electric wiring is arranged with a flexible printed circuit board from the fixed part to the coil mounted on the lens holding frame.

Further, in order to accurately move the lens holding frame with respect to the fixed part within the plane perpendicular to the optical axis, three pins are arranged at equal spaces in the circumferential direction on one of the lens holding frame and the fixed part, while three corresponding slots are formed to respectively extend in the circumferential direction in the other of the lens holding frame and the fixed part. The lens holding frame is thus arranged to move in the direction perpendicular to the optical axis while the pins are in a state of respectively abutting on the end faces in the optical axis direction of the slots.

However, the required rates of precision for machining and positioning tend to be increased by attempts to reduce the size of the whole optical system and to adapt the optical system to a zoom lens of high magnification. Then, the optical performance required cannot be satisfied if there is even a slight deviation from a perfect state. To prevent the optical performance from being degraded by play between the pins and slots, the clearance between the pins and slots must be minimized. On the other hand, in order to ensure smooth movement even under a high or low temperature condition, it is necessary to have a predetermined amount of clearance between the pins and slots. In other words, it is a prerequisite to the accurate image-shake correction to eliminate the play while keeping smooth movement of the lens holding frame.

Therefore, it has been developed to eliminate the play by urging the lens holding frame in the optical axis direction with a coiled spring in such a way as to push each of the pins against one end face in the optical axis direction of the corresponding slot.

However, if the lens holding frame is urged in the optical axis direction by means of the coiled spring, the sliding friction between the coiled spring and the lens holding frame increases. Then, the increased friction increases a loss of a driving force to make it hardly possible to correct a minute image shake. Further, even in a case where the optical performance is sufficient for permitting a slight amount of play and making the urging by means of the coiled spring unnecessary, a problem arises in that, in the case of a video camera, an operation sound due to the play or the sliding motion would be recorded during process of an image-shake correcting action.

Another problem of the conventional image-shake correcting device lies in the heavy weight of the lens holding frame which holds the correction lens. The heavy weight of the lens holding frame necessitates a large amount of current to be applied to the coil, for keeping the lens holding frame in a vertically buoyant state, against electric energy saving efforts in the cameras or the like.

BRIEF SUMMARY OF THE INVENTION

It is an object of the invention to provide an image-shake correcting device which is simply arranged at a low cost to ensure an excellent optical performance, a low operation sound and conformity to electric energy saving efforts.

To attain the above object, in accordance with an aspect of the invention, there is provided an image-shake correcting device, which comprises a fixed frame having a sliding surface, a correction lens unit arranged to correct an image shake, a holding member arranged to hold the correction lens unit, and driving means for driving the correction lens unit in a direction perpendicular to an optical axis, wherein a magnet member is provided on one of the fixed frame and the holding member and a magnetic substance is provided on the other of the fixed frame and the holding member, the holding member is pressed into contact with the sliding surface of the fixed frame by a magnetic force produced by the magnet member and the magnetic substance, and the holding member is arranged to be slidable on the sliding surface of the fixed frame by the driving means.

Further, in the image-shake correcting device, the driving means includes a magnet plate provided on one of the fixed frame and the holding member and a magnetic coil provided on the other of the fixed frame and the holding member, and the correction lens unit is driven by energizing the magnetic coil.

Further, in the image-shake correcting device, the magnetic substance is bonded to the magnetic coil.

Further, in the image-shake correcting device, the magnet member and the magnet plate are the same.

Further, in the image-shake correcting device, the magnet member is disposed at the fixed frame.

Further, in the image-shake correcting device, the magnetic substance is disposed at the holding member.

The above and other objects and features of the invention will become apparent from the following detailed description of preferred embodiments thereof taken in connection with the accompanying drawings.

DETAILED DESCRIPTION OF THE INVENTION

Hereinafter, preferred embodiments of the invention will be described in detail with reference to the drawings.
(First Embodiment)

Figure 1:
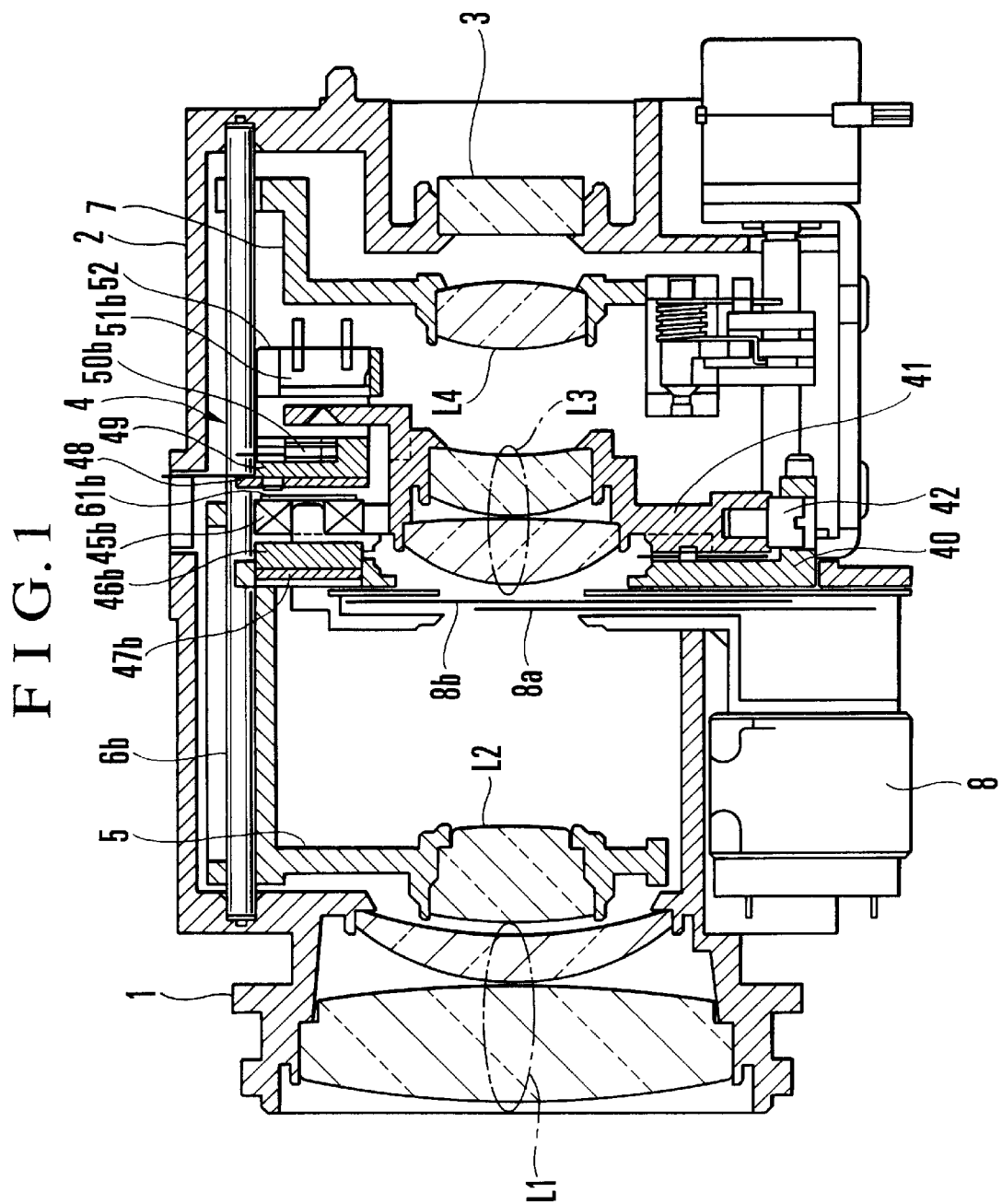
FIG. 1 is a sectional view showing a zoom lens barrel adapted for a video camera according to a first embodiment of the invention.
Figure 2:
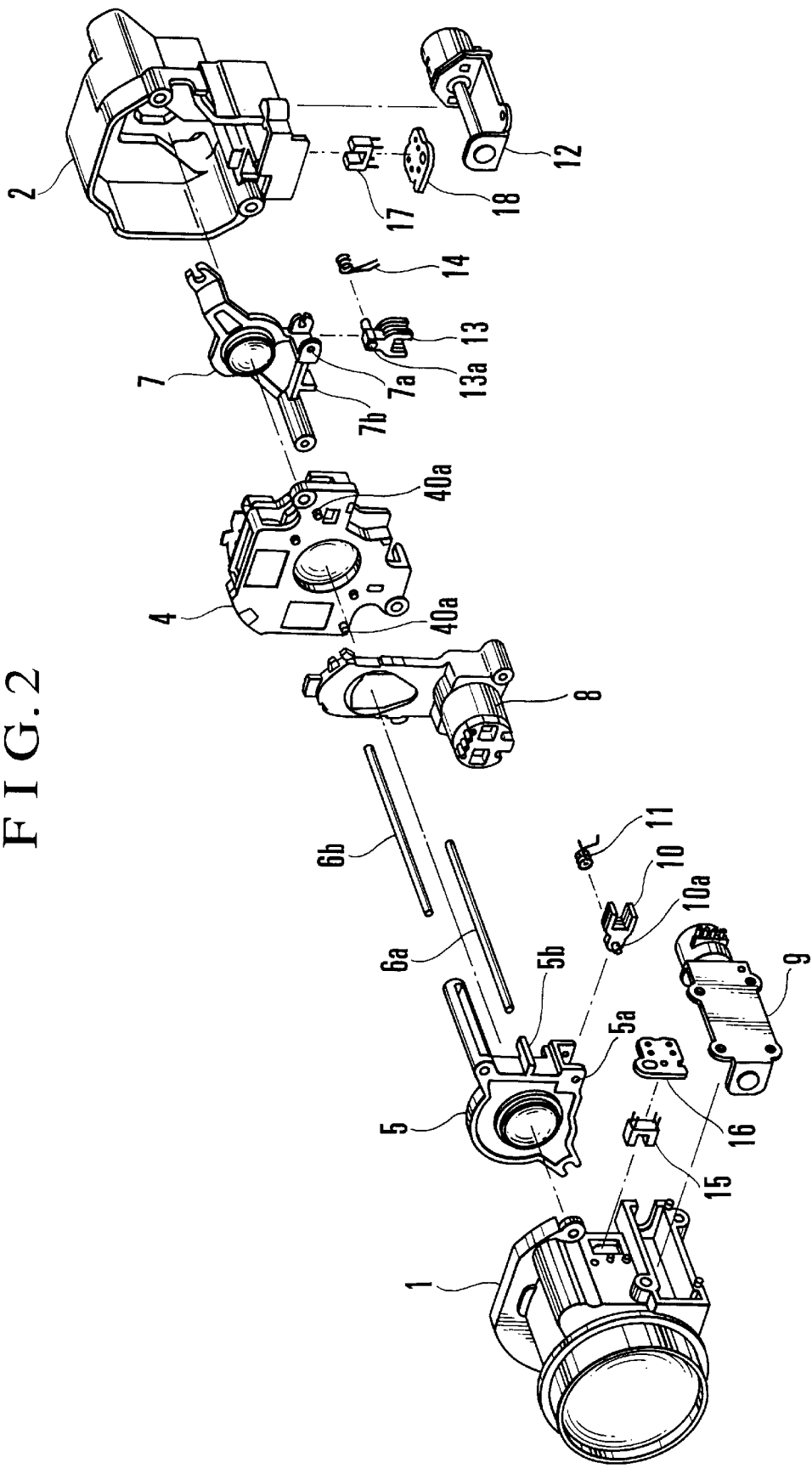
FIG. 2 is an exploded perspective view showing the zoom lens barrel shown in FIG. 1.

FIG. 1 is a sectional view showing a zoom lens barrel adapted for a video camera according to a first embodiment of the invention. FIG. 2 is an exploded perspective view of the zoom lens barrel.

Referring to FIGS. 1 and 2, a fixed tube 1 holds a first lens unit L1, and a rear tube 2 holds an optical low-pass filter 3. A CCD sensor (not shown) is disposed in rear of the fixed tube 1 and the rear tube 2.

An image-shake correcting unit 4 (image-shake correcting device) has a third lens unit (correction lens) L3 which is arranged to be driven in a direction perpendicular to an optical axis so as to correct an image shake. The image-shake correcting unit 4 is interposed between the fixed tube 1 and the rear tube 2 and is fixed there by screws.

A second-lens-unit tube 5 holds a second lens unit L2 provided for zooming. The second lens unit L2 is arranged to be movable in the direction of the optical axis in a state of being guided by two guide bars 6a and 6b which are held by the fixed tube 1 and the rear tube 2.

A fourth-lens-unit tube 7 holds a fourth lens unit L4 provided for focusing. The fourth lens unit L4 is arranged to be movable in the direction of the optical axis in a state of being guided by the two guide bars 6a and 6b, as in the second-lens-unit tube 5.

The guide bars 6a and 6b are arranged side by side across the optical axis to guide the second-lens-unit tube 5 and the fourth-lens-unit tube 7 in the direction of the optical axis and also to prevent the second-lens-unit tube 5 and the fourth-lens-unit tube 7 from turning (rolling) around the optical axis.

An IG meter 8 is arranged to drive diaphragm blades 8a and 8b by means of an electromagnetic actuator. The IG meter 8 is interposed between the fixed tube 1 and the image-shake correcting unit 4.

A zoom motor 9 is composed of a motor part which is mounted on the rear end face of a U-shaped holding plate, and an output screw part which is arranged to be rotatable between the front and rear end faces of the holding plate. The zoom motor 9 is fixedly secured to the fixed tube 1 with screws.

A rack 10 and a spring 11 are mounted on the second-lens-unit tube 5, and the rack 10 is in mesh with the output screw part of the zoom motor 9. Therefore, when the zoom motor 9 rotates, the output screw part and the rack 10 act to drive and cause the second-lens-unit tube 5 to move in the direction of the optical axis.

A focus motor 12 is arranged in the same manner as the zoom motor 9 and is fixedly secured to the rear tube 2 with screws. Similar to the second-lens-unit tube 5, the fourth-lens-unit tube 7 also has a rack 13 and a screw 14 mounted thereon. The rack 13 is in mesh with the output screw part of the focus motor 12 to drive and cause the fourth-lens-unit tube 7 to move in the direction of the optical axis when the focus motor 12 rotates.

The racks 10 and 13 have their shaft parts 10a and 13a fitted in hole parts 5a and 7a formed in the second-lens-unit tube 5 and the fourth-lens-unit tube 7, respectively, to extend in the direction of the optical axis. The racks 10 and 13 are thus arranged to be swingable on their shaft parts 10a and 13a with respect to the second-lens-unit tube 5 and the fourth-lens-unit tube 7, respectively. Therefore, even if the parallelism of each of the output screw shafts deviates with respect to the guide bars 6a and 6b, the swingable arrangement ensures a smooth movement of each of the second-lens-unit tube 5 and the fourth-lens-unit tube 7. Further, the racks 10 and 13 are urged respectively by the springs 11 and 14 in the direction of the optical axis as well as in the direction of swinging (in the direction of meshing with the output screw shafts). The arrangement enables the meshing parts of the racks 10 and 13 to adequately mesh with the output screw shafts without any meshing play or any thrust play.

In the first embodiment, stepping motors are employed as the zoom motor 9 and the focus motor 12. The stepping motors, however, may be replaced with DC motors.

A photo-interrupter 15 is secured to the fixed tube 1 with a screw after its terminals are soldered to a circuit board 16. When a light-blocking wall part 5b of the second-lens-unit tube 5 passes between a light-projecting part and a light-receiving part of the photo-interrupter 15, the photo-interrupter 15 outputs a signal indicating the passing of the light-blocking wall part 5b. Upon receipt of this signal, a microcomputer which is disposed within a camera body detects the reference position of the second-lens-unit tube 5 and sends a step pulse signal to the zoom motor 9 for driving the second-lens-unit tube 5, i.e., the second lens unit L2, to a desired zoom position on the basis of the signal from the photo-interrupter 15.

Another photo-interrupter 17 is secured to the rear tube 2 with a screw after its terminals are soldered to a circuit board 18. When a light-blocking wall part 7b of the fourth-lens-unit tube 7 passes between a light-projecting part and a light-receiving part of the photo-interrupter 17, the photo-interrupter 17 outputs a signal indicating the passing of the light-blocking wall part 7b. Upon receipt of this signal, the microcomputer detects the reference position of the fourth-lens-unit tube 7 and sends a step pulse signal to the focus motor 12 for driving the fourth-lens-unit tube 7, i.e., the fourth lens unit L4, to a desired focus position on the basis of the signal from the photo-interrupter 17.

Figure 3:
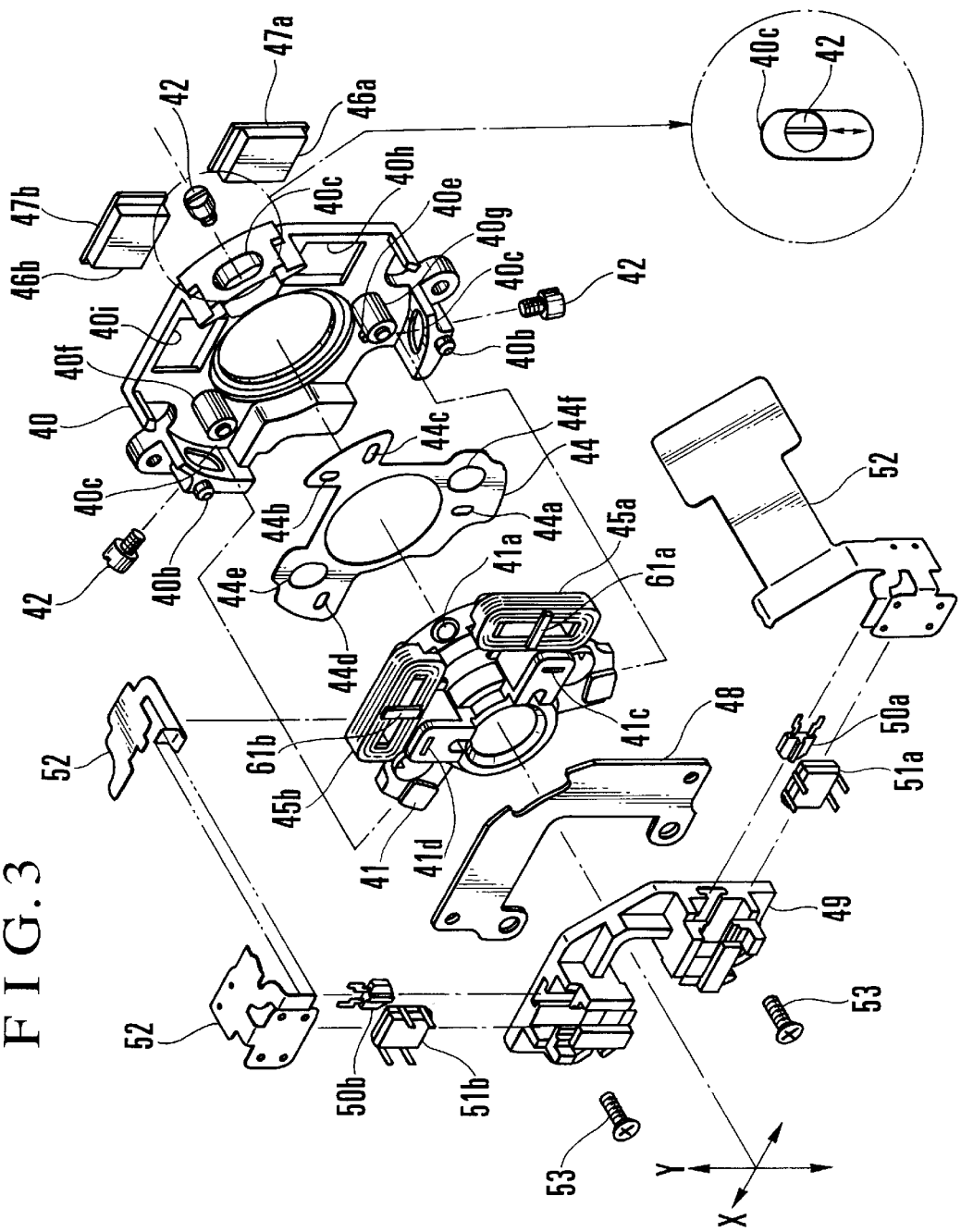
FIG. 3 is an exploded perspective view showing an image-shake correcting unit mounted on the zoom lens barrel shown in FIG. 1.
Figure 4:
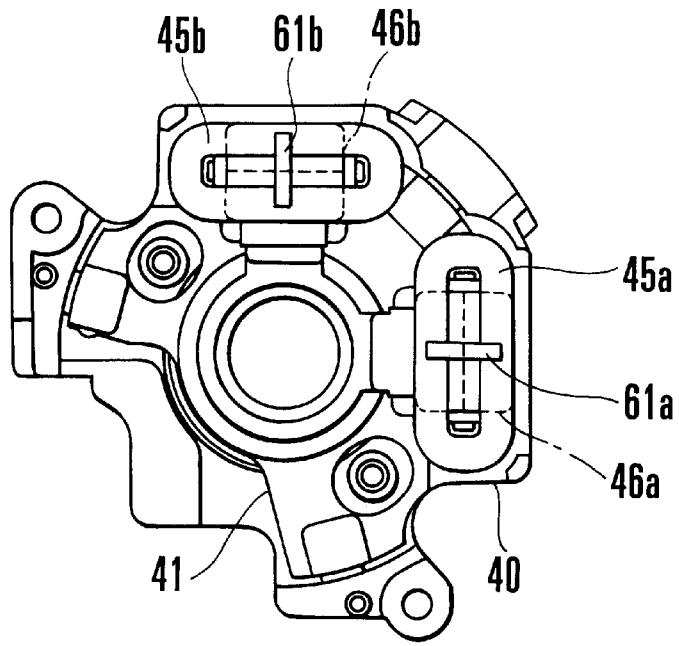
FIG. 4 is a front view showing the mounting state of iron pieces in the image-shake correcting unit shown in FIG. 3.

The arrangement of the image-shake correcting unit 4 is next described referring to FIGS. 3 and 4. FIG. 3 is an exploded perspective view of the image-shake correcting unit 4. FIG. 4 shows the arrangement of an electromagnetic actuator of the image-shake correcting unit 4.

Referring to FIGS. 3 and 4, a fixed frame 40 is a body member of the image-shake correcting unit 4. The fixed frame 40 is provided with two bosses 40a (see FIG. 2) for positioning with respect to the fixed tube 1 and two bosses 40b for positioning with respect to the rear tube 2. The fixed frame 40 is interposed between the fixed tube 1 and the rear tube 2. A movable frame (lens holding member) 41 holds the third lens unit L3, which is a correction lens.

The movable frame 41 has holes 41a formed in three parts and arranged on the outer side in the circumferential direction thereof. Pins 42 are press-fitted into and secured to the respective holes 41a. Slots (guide parts) 40c are formed in three parts of the fixed frame 40 to extend in the circumferential direction thereof. The pins 42 are fitted into the respective slots 40c. The movable frame 41 is thus arranged to be movable in the direction perpendicular to the optical axis within a predetermined range as the pins 42 are smoothly slidable in the slots 40c.

The pins 42 and the slots 40c are equally spaced at intervals of 120° and are disposed on one and the same plane. The pins 42 and the slots 40c are arranged to be kept in a balanced state in such a way as to prevent any moment around the optical axis from being exerted on the movable frame 41 due to any load caused by a sliding friction between each of the pins 42 and the end face of the corresponding slot 40c.

A roll prevention plate 44 is arranged to prevent the movable frame 41 from turning around the optical axis during the correction of an image shake. The roll prevention plate 44 is provided with slots 44a and 44b, which are fitted on a boss 40e provided on the fixed frame 40 and another boss which is not shown, respectively. Slots 44c and 44d, which are also formed in the roll prevention plate 44, are fitted on bosses (not shown) provided on the movable frame 41.

Hole parts 44e and 44f, which are also provided in the roll prevention plate 44, are arranged to allow support posts 40f and 40g provided on the fixed frame 40 to pierce through them. The support posts 40f and 40g are arranged in such a size that they never interfere with the roll prevention plate 44 even when the roll prevention plate 44 moves to its maximum extent. In other words, the roll prevention plate 44 is allowed to move only vertically with respect to the fixed frame 40, while the movable frame 41 is movable only to the right and left with respect to the roll prevention plate 44, as viewed FIG. 3. The combination of these moving directions enables the movable frame 41 to vertically move with respect to the fixed frame 40 without turning around the optical axis.

A driving mechanism for the movable frame 41 is next described. Coils 45a and 45b are secured to the movable frame 41 and are respectively used for driving in the horizontal direction (hereinafter referred to as X direction) and in the vertical direction (hereinafter referred to as Y direction). Magnets (magnet members) 46a and 46b are respectively magnetized to have two poles in the X and Y directions. The magnets 46a and 46b are attracted by magnetic force to lower yokes 47a and 47b, respectively, which are made of an iron material or the like. The magnets 46a and 46b are inserted into hole parts 40h and 40i, respectively, from the rear side of the fixed frame 40 and are thus secured to the fixed frame 40. An upper yoke 48 which is made of a material similar to that of the lower yokes 47a and 47b is secured to posts 40f and 40g from the front side of the fixed frame 40 with screws 53 together with a sensor holder 49 which will be described later herein. Magnetic circuits for driving in the X and Y directions are thus respectively formed by these parts.

More specifically, a magnetic circuit for driving in the X direction is formed by the magnet 46a, the lower yoke 47a and the upper yoke 48 with the coil 45a inserted in the magnetic circuit. A magnetic circuit for driving in the Y direction is formed by the magnet 46b, the lower yoke 47b and the upper yoke 48 with the coil 45b inserted in the magnetic circuit. Moving-coil-type electromagnetic actuators are formed in the above manner.

Light-projecting elements 50a and 50b are IREDs or the like. Light-receiving elements 51a and 51b are PSDs or the like. A correction lens position sensor is composed of the light-projecting elements 50a and 50b and the light-receiving elements 51a and 51b, which are inserted from outside into the sensor holder 49 and fixed there by bonding. When narrow slits 41c and 41b, which are formed integrally with the movable frame 41, are inserted respectively between the light-projecting elements 50a and 50b and the light-receiving elements 51a and 51b, only infrared rays that pass through the slits 41c and 41d among infrared rays projected from the light-projecting elements 51a and 51b are received by the light-receiving elements 51a and 51b. The positions of the movable frame 41 in the X and Y directions can be detected by using these infrared rays passing through the slits 41c and 41d.

The light-projecting elements 50a and 50b and the light-receiving elements 51a and 51b are connected to a flexible printed circuit board 52, which is illustrated in a divided state in FIG. 3. The light-projecting elements 50a and 50b and the light-receiving elements 51a and 51b are thus connected to the microcomputer disposed on the side of the camera body through the flexible printed circuit board 52. Further, wires for the coils 45a and 45b are connected through the flexible printed circuit board 52 to a driving circuit which is disposed on the side of the camera body.

Narrow plate-like iron pieces (magnetic substances) 61a and 61b, which measure about 0.1 mm in thickness, are fixed by bonding to the coils 45a and 45b at about the center parts of the coils 45a and 45b in directions perpendicular to the winding directions thereof, respectively, as viewed in the direction of the optical axis in FIG. 4. With the above parts arranged in such a manner, the movable frame 41 is biased toward the fixed frame 40 by the attracting magnetic forces produced by the iron pieces 61a and 61b and the magnets 46a and 46b, so that each of the three pins 42 can be set into pressed contact with one end face of the corresponding one of the slots 40c. Accordingly, the play between the pins 42 and the slots 40c is thus effectively prevented from being produced. It is, therefore, possible to prevent the optical performance of the lens barrel from being degraded by the play between the pins 42 and the slots 40c and to minimize noises produced during the image-shake correction.

Further, the conventional arrangement which uses a coiled spring or a leaf spring causes a loss of the driving force due to friction taking place at the two end parts which receive an urging force. In the case of the first embodiment, on the other hand, a magnetic force is used to apply a noncontact urging force, which causes a less amount of loss of the driving force. Therefore, according to the arrangement of the first embodiment, even a slight amount of image shake can be adequately corrected, and a sliding noise can also be minimized. Further, since the sliding surface of the slot 40c is located only on one end of the slot 40c, a high degree of precision can be easily attained in machining parts.

Besides, according to the arrangement of the first embodiment, assembly work can be done by just adhering the iron pieces 61a and 61b to the coils 45a and 45b. Therefore, the arrangement of the first embodiment facilitates assembly work as it obviates the necessity of doing the assembly work by keeping a spring in a charged state as in the conventional arrangement.

In addition, as shown in FIG. 4, the iron pieces 61a and 61b are secured to the coils 45a and 45b in such a way as to have the centers of the iron pieces 61a and 61b located at the centers of the magnets 46a and 46b (boundaries between N and S poles) as viewed in the direction of the optical axis when the optical axis of the correction lens L3 coincides with the optical axis (reference optical axis) of the first lens unit L1. Therefore, the magnetic circuits which are formed respectively between the iron pieces 61a and 61b and the magnets 46a and 46b become most stable when the optical axis of the correction lens L3 comes to coincide with that of the first lens unit L1. The effect of image-shake correction, therefore, can be prevented from becoming unbalanced depending on the position of the correction lens L3. Further, the amount of electric energy required in energizing the coil 45b for sustaining the weights of the correction lens L3 and the movable frame 41 can be lessened.

Figure 5:
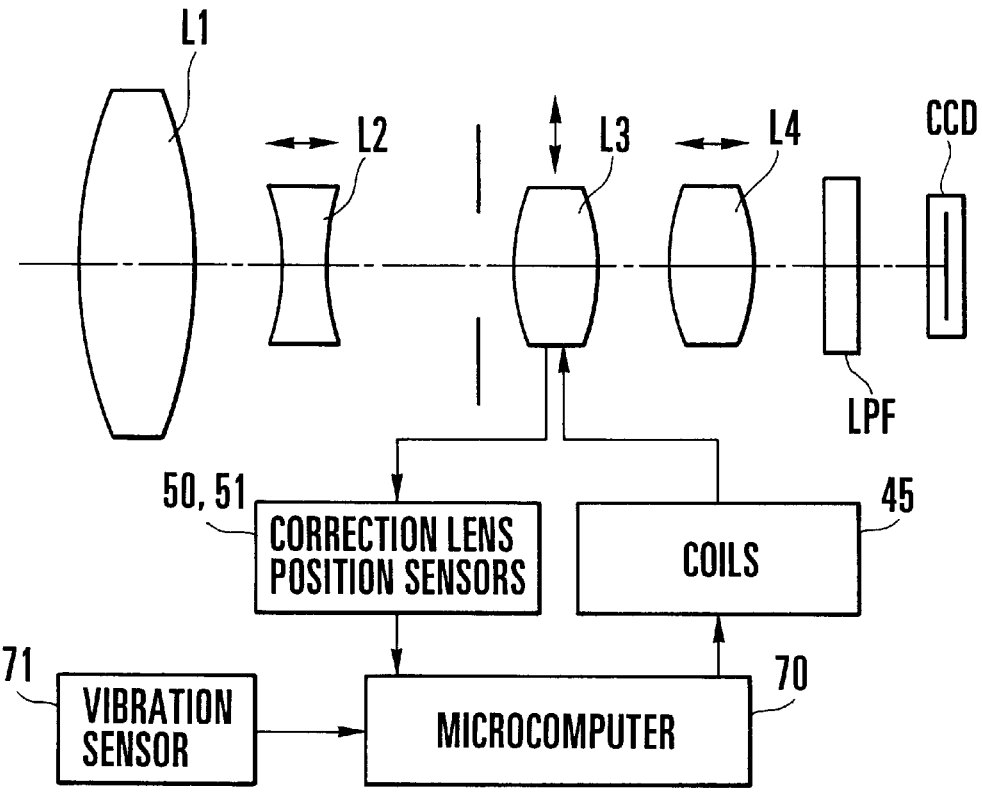
FIG. 5 is a diagram showing a control system arranged to control the image-shake correcting unit shown in FIG. 3.

Control over the image-shake correcting unit 4 is next described. FIG. 5 shows a control system for the image-shake correcting unit 4. Referring to FIG. 5, a microcomputer 70 is arranged to preside control over the whole control system. A vibration sensor 71 is composed of a vibration gyro or the like and is arranged to detect the vibrations of the camera in the form of angular velocity and angles.

The microcomputer 70 computes the amount of vibrations of the camera on the basis of a detection signal from the vibration sensor 71, and then computes an amount of shift to a target position of the correction lens L3, i.e., the movable frame 41, in such a way as to cancel an image shake caused by the vibrations of the camera. In accordance with the computed amount of shift, the coils 45 (45a and 45b) of the electromagnetic actuator are energized to drive the correction lens L3. In this instance, the position of the correction lens L3 is detected by the correction lens position sensors 50 and 51. The results of detection are fed back to the microcomputer 70, so that the correction lens L3 can be accurately moved to the target position.

In the zoom lens, the amount of shift (to the target position) of the correction lens L3 for canceling vibrations varies according to the focal length, even for the same amount of vibrations. Therefore, the first embodiment is arranged to detect the focal length on the basis of the number of pulses used for driving the second lens unit L2 and to vary the amount of driving of the correction lens L3 according to the focal length thus detected.

(Second Embodiment)

Figure 6:
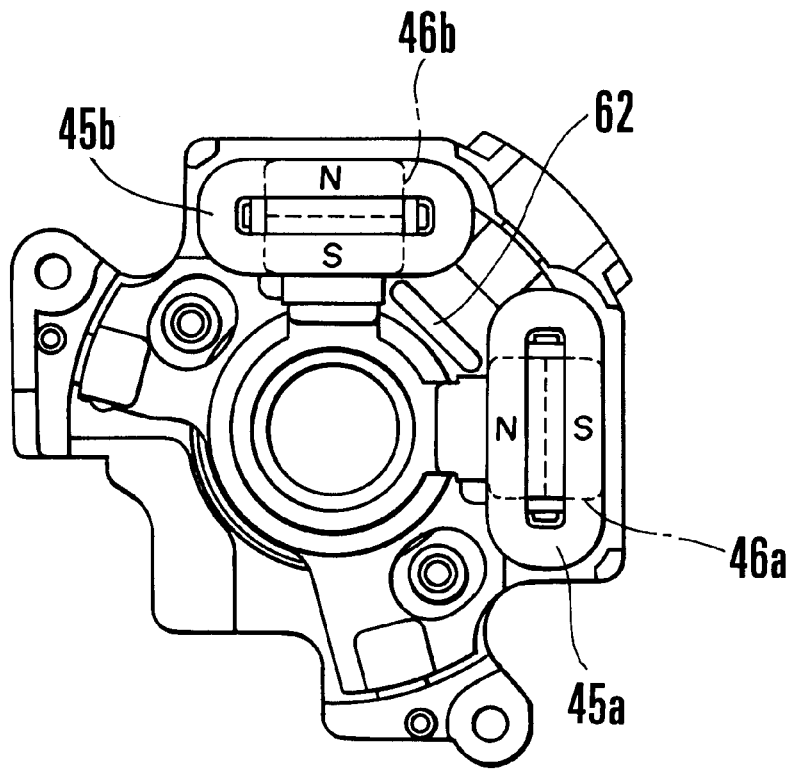
FIG. 6 is a front view showing the mounting state of iron pieces in an image-shake correcting unit according to a second embodiment of the invention.
Figure 7:
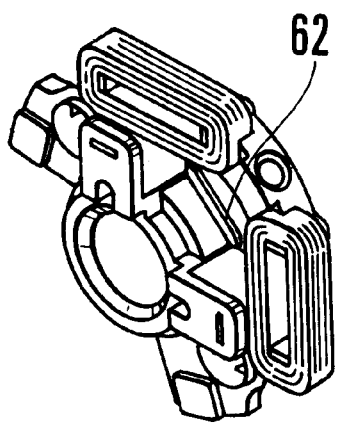
FIG. 7 is a perspective view showing the mounting state of the iron pieces in the image-shake correcting unit according to the second embodiment of the invention.

FIGS. 6 and 7 show the arrangement of a movable frame in an image-shake correcting unit according to a second embodiment of the invention. The basic arrangement of the second embodiment is the same as that of the first embodiment. Therefore, all component elements that are the same as those of the first embodiment are indicated by the same reference numerals as in the first embodiment.

Although in the first embodiment the two electromagnetic actuators are respectively provided with the iron pieces which are magnetic substances, only one iron piece is provided for the two electromagnetic actuators in the case of the second embodiment.

In FIGS. 6 and 7, reference numeral 62 denotes the iron piece (magnetic substance). As in the first embodiment, the iron piece 62 is in a narrow plate-like shape. The iron piece 62 is fixed by bonding between the two coils 45a and 45b on the movable frame 41. More specifically, the iron piece 62 constitutes a magnetic circuit in conjunction with the N pole of the magnet 46a which is provided for driving in the X direction and the S pole of the magnet 46b which is provided for driving in the Y direction. The iron piece 62 is mounted in a position where the magnetic circuit becomes most stable when the optical axis of the correction lens L3 comes to coincide with that of the first lens unit L1, etc.

Accordingly, similar to the case of the first embodiment, the movable frame 41 is biased toward the fixed frame 40 by the attracting magnetic force produced between the iron piece 62 and the magnets 46a and 46b, to have each of the three pins 42 in pressed contact with the end face on one side of the corresponding one of the slots 40c. Therefore, the play between the pins 42 and the slots 40c can be suppressed.

According to the arrangement of the second embodiment, the play can be adequately suppressed by mounting only one iron piece 62 on the movable frame 41 in a most simplified manner.

(Third Embodiment)

Figure 8:
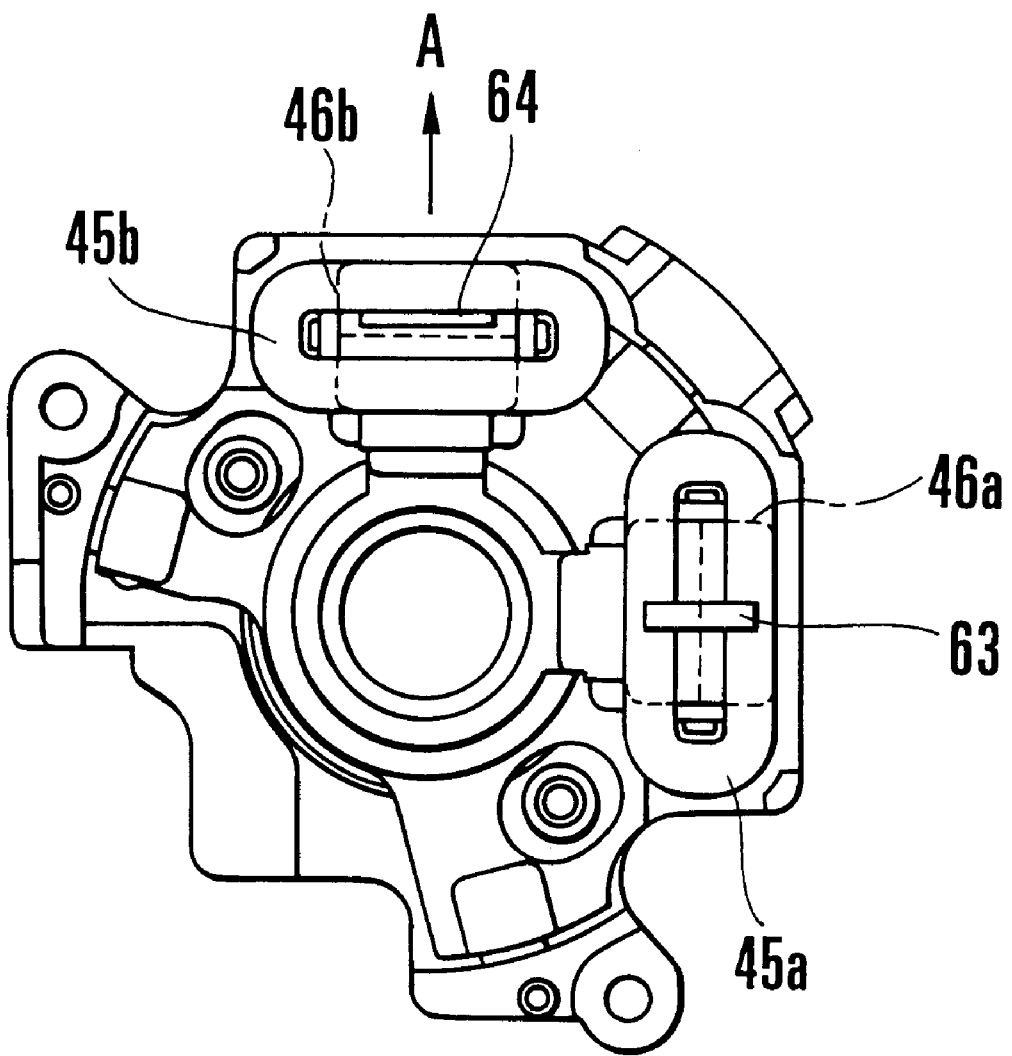
FIG. 8 is a front view showing the mounting state of iron pieces in an image-shake correcting unit according to a third embodiment of the invention.

FIG. 8 shows the arrangement of a movable frame in an image-shake correcting unit according to a third embodiment of the invention. The basic arrangement of the third embodiment is the same as that of the first embodiment. Therefore, all component elements that are the same as those of the first embodiment are indicated by the same reference numerals as in the first embodiment.

In the first embodiment, two iron pieces are mounted on the coils in the same manner (at about the center of the coil in the direction perpendicular to the winding direction of the coil as viewed in the direction of the optical axis). In the case of the third embodiment, on the other hand, while one iron piece 63 is mounted on the X-direction-driving coil 45a in the same manner as in the first embodiment, the other iron piece 64 is mounted on the Y-direction-driving coil 45b in a manner different from that in the first embodiment. More specifically, the iron piece 64 is secured by bonding to the upper part on the inner circumferential side of the coil 45b.

With the third embodiment arranged in the above-stated manner, the movable frame 41 is, similar to the case of the first embodiment, is biased toward the fixed frame 40 by the attracting magnetic forces produced between the iron pieces 63 and 64 and the magnets 46a and 46b, to have each of the three pins 42 in pressed contact with the end face on one side of the corresponding one of the slots 40c.

Further, when the optical axis of the correction lens L3 comes to coincide with the optical axis of the first lens unit L1, etc., the iron piece 64 is located in a position deviating upward from the center of the magnet 46b as viewed in the direction of the optical axis. This enables the iron piece 64 to be pulled in the direction of an arrow A toward an upper side pole of the magnet 46b which is magnetized to have two poles. Therefore, the amount of electric energy required in energizing the coil 45b for sustaining the weights of the correction lens L3 and the movable frame 41 can be lessened further by the upward pulling action.

In the embodiments described above, a moving-coil-type electromagnetic actuator is used as driving means for the correction lens. The invention applies also to image-shake correcting devices using a motor, an electrostrictive element or an electromagnetic actuator of some other type for driving the correction lens.

In each of the embodiments described above, the magnet of the electromagnetic actuator is used also as a magnet member. In accordance with the invention, however, the magnet member is not limited to the magnet of the electromagnetic actuator. For example, some member may be separately arranged to serve as a dedicated magnet member. Further, in a case where a magnetic sensor is used for detecting the position of the correction lens (the lens holding frame) in the direction perpendicular to the optical axis, it is possible to use a component member of the magnetic sensor also as the magnet member.

In the case of each of the embodiments described above, the image-shake correcting device is used for a lens barrel or a camera. However, the image-shake correcting device according to the invention is usable also for other optical apparatuses of varied kinds, such as a binocular, etc.

As mentioned in the foregoing, the lens holding member is pressed into contact with the guide member in a noncontact manner by means of a magnetic force produced between the magnet member mounted on one of the body member and the lens holding member and the magnetic substance mounted on the other of the body member and the lens holding member. Therefore, not only the play of the lens holding member in the direction of the optical axis can be reliably prevented but also a loss in the driving force due to the sliding friction can be lessened to enable the image-shake correcting device to adequately correct an image shake even for a minute vibration.

Further, if a component member of the lens-holding-frame driving electromagnetic actuator or a component member of the magnetic sensor which detects the position of the lens holding member in the direction perpendicular to the optical axis is arranged to be used also as the magnet member, the number of necessary component parts can be lessened and an image-shake correction can be performed accurately with a simpler structural arrangement.

Further, the center of the magnetic substance is located at the boundary between the poles of the magnet member as viewed in the direction of the optical axis, when the optical axis of the correction lens comes to coincide with the reference optical axis of the lens barrel. Therefore, the effect of the image-shake correction can be prevented from becoming unbalanced according to the position of the correction lens.

Further, in a case where two electromagnetic actuators are used for driving in the X-axis and Y-axis directions of the direction perpendicular to the optical axis, component members of the electromagnetic actuators are used also as the magnet members and only one magnetic substance is disposed between the two magnet members. Therefore, the structural arrangement can be further simplified.

Further, the downward movement of the lens holding member due to its own weight is prevented by a magnetic force produced between a magnet member mounted on one of the body member and the lens holding member and a magnetic substance mounted on the other of the body member and the lens holding member. This gives a further advantage in that, in a case where, for example, a member (magnet) constituting the electromagnetic actuator serving as a drive source of the image-shake correcting device is used also as a magnet member, the electric energy to be applied to the electromagnetic actuator for holding the lens holding member against its weight can be lessened. Therefore, in accordance with the invention, there can be provided an image-shake correcting device capable of saving electric energy.

What is claimed is:

1. An image-shake correcting device comprising:

a fixed frame having a sliding surface;

a correction lens unit arranged to correct an image shake;

a holding member arranged to hold said correction lens unit; and driving means for driving said correction lens unit in a direction perpendicular to an optical axis, wherein a magnet member is provide on one of said fixed frame and said holding member and a magnetic substance is provided on the other of said fixed frame and said holding member, said holding member is pressed into contact with the sliding surface of said fixed frame by a magnetic force produced by said magnet member and said magnetic substance, and said holding member is arranged to be slidable on the sliding surface of said fixed frame by said driving means.

2. An image-shake correcting device according to claim 1, wherein said driving means includes a magnet plate provided on one of said fixed frame and said holding member and a magnetic coil provided on the other of said fixed frame and said holding member, and said correction lens unit is driven by energizing said magnetic coil.

3. An image-shake correcting device according to claim 2, wherein said magnetic substance is bonded to said magnetic coil.

4. An image-shake correcting device according to claim 2, wherein said magnet member and said magnet plate are the same.

5. An image-shake correcting device according to claim 1, wherein said magnet member is disposed at said fixed frame.

6. An image-shake correcting device according to claim 4, wherein said magnetic substance is disposed at said holding member.

7. An image-shake correcting device according to claim 1, wherein the sliding surface of said fixed frame is a plane which is perpendicular to the optical axis.

* * * * *

UNITED STATES PATENT AND TRADEMARK OFFICE
CERTIFICATE OF CORRECTION

PATENT NO. : 6,112,028
DATED : August 29, 2000
INVENTOR(S) : Tadanori Okada

It is certified that error appears in the above-identified patent and that said Letters Patent is hereby corrected as shown below:

Column 7,
Line 21, delete "preside" and insert -- provide --.

Signed and Sealed this

Sixth Day of November, 2001

Attest:

Nicholas P. Godici

NICHOLAS P. GODICI
Attesting Officer  *Acting Director of the United States Patent and Trademark Office*